(12) United States Patent
Soni et al.

(10) Patent No.: US 12,120,188 B2
(45) Date of Patent: Oct. 15, 2024

(54) SYSTEM AND METHOD FOR PRESENTING INFORMATION FROM DIFFERENT APPLICATIONS IN AN INTEGRATED MANNER

(71) Applicant: RAKUTEN MOBILE, INC., Tokyo (JP)

(72) Inventors: Harsh Soni, Indore (IN); Sourabh Shukla, Indore (IN); Nikhil Raghuwanshi, Indore (IN); Vishal Bokey, Indore (IN); Rina Takamatsu, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/801,371

(22) PCT Filed: Jun. 22, 2022

(86) PCT No.: PCT/US2022/034498
§ 371 (c)(1),
(2) Date: Aug. 22, 2022

(87) PCT Pub. No.: WO2023/249624
PCT Pub. Date: Dec. 28, 2023

(65) Prior Publication Data
US 2024/0244114 A1 Jul. 18, 2024

(51) Int. Cl.
H04L 67/306 (2022.01)
G06F 3/0482 (2013.01)
(52) U.S. Cl.
CPC .......... H04L 67/306 (2013.01); G06F 3/0482 (2013.01)
(58) Field of Classification Search
None
See application file for complete search history.

(56) References Cited

U.S. PATENT DOCUMENTS 8,650,290 B2 * 2/2014 Dare ................ G06F 9/451
709/224
2013/0262238 A1 * 10/2013 Liubachev ......... G06Q 30/0277
705/14.66

(Continued)

OTHER PUBLICATIONS

Desai et al., "A graphical user interface for tele-operated robotic sample acquisition", Aug. 1, 2012, IEEE, 2012 IEEE International Conference on Mechatronics and Automation (2012, pp. 1202-1207) (Year: 2012).*

(Continued)

Primary Examiner — Davoud A Zand
(74) Attorney, Agent, or Firm — Sughrue Mion, PLLC

(57) ABSTRACT

A method of providing information for a user in an integrated presentation system. The method includes, based on receiving user identification information, controlling to output a list including one or more users matching the first identification information in a graphical user interface (GUI), receiving a selection of a first user from among the one or more user in the list output on the GUI, sending a plurality of parameters to a server, the plurality of parameters including first information corresponding to a first application, second information corresponding to a second application, and third information corresponding to one or more identifying parameters of the selected first user, receiving first data associated with the first user from the first application and second data associated with the first user from the second application and controlling to output the first data and the second data in the GUI in an integrated manner.

20 Claims, 13 Drawing Sheets

(56) References Cited

U.S. PATENT DOCUMENTS

2020/0005393 A1* 1/2020 Cawley ............... G06F 3/0482
2020/0065090 A1 2/2020 Kolb et al.
2021/0349803 A1 11/2021 Meurer et al.

OTHER PUBLICATIONS

International Search Report dated Jan. 3, 2023 in International Application No. PCT/US22/34498.
Written Opinion dated Jan. 3, 2023 in International Application No. PCT/US22/34498.

* cited by examiner

Search Customer

◉ Matched With  ○ Includes

| Mobile Number | Last Name | First Name |
|---|---|---|
| [_____] 11 | [Last Name] 100 | [First Name] 100 |

| Last Name Kana | First Name Kana | Status | Customer Account Number |
|---|---|---|---|
| [Last Name Kana] 100 | [First Name Kana] 100 | [Select Status ▾] | [Customer Account Number] |

| Gender | Contact Phone Number | Contact Email Address | Date of Birth |
|---|---|---|---|
| [Gender ▾] | [Contact Phone Number] 11 | [Contact Email Address] 200 | [Select Date 📅] |

| IMEI | ICCID | Customer Address | Rakuten Point Account Number |
|---|---|---|---|
| [IMEI] | [ICCID] | [Customer Address] | [Rakuten Point Account Number] |

Other Details

| Ticket ID | Order ID |
|---|---|
| [Ticket ID] | [Order ID] |

[Cancel] [Apply]

First Application
Customer 360 > List

🔍 Search | Apps ▼

Displaying 49 of 49

| Status | Customer Account Number | Last Name | First Name | Last Name Kana | First Name Kana |
|--------|------------------------|-----------|------------|----------------|------------------|
| ○ Active | | | | | じ |
| ○ Active | | | | じ | じ |
| ○ Active | | | | じ | じ |
| ○ Active | | | | じ | じ |
| ○ Active | | | | じ | じ |
| ○ Active | | | | じ | じ |

Filters ✕

Last Name

First Name
First Name

Last Name Kana
Last Name Kana

First Name Kana
じ

Contact Phone Number
Contact Phone Number

Contact Email Address 0/11
Contact Email Address

| OverView | Billing | Order | Customer Information | Products and Services | Interaction | Document |

Displaying 1 of 1

- Billing Account
- Bills
- Payments
- Carrer Billing
- Adjustment

| Status | Number | Acured Revenue (+) / Deposit (-) | Collections Treatment Stage | Monthly Payment method | Billing Contact |
|---|---|---|---|---|---|
| Billable | 123456789 | ¥0 | No | Visa | ⓘ |

FIG. 7C

| OverView | Billing | Order | Customer Information | Products and Services | Interaction | Document |

Communications: Chat History, Foresight Tickets, eCare Feedback

Displaying 5 of 5

| ID | Destination | Title | Sender | Completed Date | Created By | |
|---|---|---|---|---|---|---|
| ID-001 | 123456789 | OC Sanity Test-Send All | OCTest1 | 2021-05-08 09:00 | Creator1 | |
| ID-002 | destination1@gmail.com | Test one-to-one email | 12344321 | 2021-05-08 04:27 | Creator2 | |
| ID-003 | 223456789 | IEOC test | Sender3 | 2021-05-08 00:16 | Sender3 | Omnicare Support |
| ID-004 | 323456789 | sms | Sender4 | 2021-04-29 10:48 | Sender4 | Omnicare Support |
| ID-005 | 423456789,ID-001 | Rina | Sender5 | 2021-04-27 19:33 | Sender5 | - |

| OverView | Billing | Order | Customer Information | Products and Services | Interaction | Document |
|---|---|---|---|---|---|---|

> Communications
  Chat History
∨ Tickets
  Service Desk
  CCT Tickets
  Foresight Tickets
> Feedback

| ≪ Displaying 0 of 0 | | | | | | | My Tickets ∨ ↻ ∨ □ ▽ | ≡ |

| Status ☰ | Ticket ID ☰ | Ticket Title | Urgency | Priority | Impact | Ticket Family | Domain |
|---|---|---|---|---|---|---|---|
| | | ↕ | • • • | | | | |

FIG. 7D

| OverView | Billing | Order | Customer Information | Products and Services | Interaction | Document |
|---|---|---|---|---|---|---|

Contract
Questionnaire
Customer Identity
Attachment
Notes

| ≪ Displaying 3 of 3 | | | | | | | ≡ |

| Name | Status | Valid From | Terminated Date | Program ID | Signature Type | Contract Doc |
|---|---|---|---|---|---|---|
| | • Active | 2019-09-30 | - | - | Web | - |
| | • Cancelled | - | - | - | Web | - |
| | • Signed | - | - | - | Manual | - |

FIG. 7E

| Overview | Billing | Order | Customer Information | Products and Services | Interaction | Document | | |
|---|---|---|---|---|---|---|---|---|
| Contract Lines | | | | | | | | |
| Status | Line BPI | | Plan Top BPI | Mobile Phone Number/IMSI | Actual Start Date | Contract | Billing Account | |
| ● Activation in ... | Free Plan | | 100GB Free Plan | 11111111 | - | - | - | 📧 |
| ○ Active | Free Plan | | 100GB Free Plan | 22222222 | 2019-09-30 | - | - | SMS |
| | | | | | | | | |
| Products | | | | | | | | |
| Status | Business Product Instance | | | Activation Date | Billing Account | | Customer Location | |
| Completed | Administrative Service Fee | | | 2019-09-30 | - | | - | |
| Completed | Cash on Delivery Fee | | | 2019-09-30 | - | | - | |
| Completed | Prefered Phone Number | | | 2019-09-30 | - | | - | |

FIG. 7F

SYSTEM AND METHOD FOR PRESENTING INFORMATION FROM DIFFERENT APPLICATIONS IN AN INTEGRATED MANNER

CROSS REFERENCE TO RELATED APPLICATIONS

This application is a National Stage of International Application No. PCT/US2022/034498 filed Jun. 22, 2022.

BACKGROUND

1. Field

The present disclosure relates to a system and a method for presenting information from different application in an integrated manner.

2. Description of the Related Art

Multiple applications may be hosted and deployed in a particular ecosystem (or system), such as a cloud platform for an enterprise or business in various industries, for providing various services to customers. For example, in telecommunication industry, a customer may contact a customer agent of the enterprise or business with a query or a question regarding issues related to services provided by the enterprise or the business. In this case, the customer agent needs to answer the customer's query or resolve the issues raised by the customer quickly and efficiently to satisfy the customer.

In a related art system in an industry, such as, a telecom industry, an agent would have to review various customer information, such as, network usage, billing, and device point of view, in order to answer the customer's query or resolve the issues raised by the customer. However, the various customer information may have to be retrieved from different data sources (e.g., different third party vendors). As such, the agent would have to login separately to access multiple systems or applications to gather customer's information which delays the process and becomes time-consuming.

SUMMARY

According to one or more embodiments, systems and methods are provided that allows agents to access and retrieve customer information in real-time and user-friendly manner by integrating information from multiple data sources in one view. As such, systems and methods of the disclosure may provide improved search experience by multi-variable search and offers remote support.

According to an aspect of the disclosure, there is provided a method of providing information for a user in an integrated presentation system, the method including: based on receiving user identification information, controlling to output a list including one or more users matching the user identification information in a graphical user interface (GUI), receiving a selection of a first user from among the one or more user in the list output on the GUI, sending a plurality of parameters to a server, the plurality of parameters including first information corresponding to a first application, second information corresponding to a second application, and third information corresponding to one or more identifying parameters of the selected first user, receiving first data associated with the first user from the first application and second data associated with the first user from the second application; and controlling to output the first data and the second data in the GUI in an integrated manner.

The method further includes controlling to output the first data and the second data in the GUI in a selectable manner, receiving a selection of at least one of the first data or the second data receiving at least one of first additional detailed information corresponding to the first data associated with the first user from the first application or second additional detailed information corresponding to the second data associated with the first user from the second application and controlling to output at least one of the first additional detailed information or the second additional detailed information in the GUI.

The first application may correspond to a first data source storing first service information related to a first service associated with the first user, and the second application may correspond to a second data source storing second service information related to a second service associated with the first user.

The first application may correspond to a first external server storing first service information related to a first service associated with the first user, and the second application may correspond to a second external server storing second service information related to a second service associated with the first user.

The method may further include controlling to display both the first data and the second data in a single pane.

According to another aspect of the disclosure, there is provided an integrated presentation system for providing information for a user, the integrated presentation system including: a memory storing instructions; and at least one processor configured to execute the instructions to: based on receiving user identification information, control to output a list including one or more users matching the user identification information in a graphical user interface (GUI), receive a selection of a first user from among the one or more user in the list output on the GUI, send a plurality of parameters to a server, the plurality of parameters including first information corresponding to a first application, second information corresponding to a second application, and third information corresponding to one or more identifying parameters of the selected first user, receive first data associated with the first user from the first application and second data associated with the first user from the second application and control to output the first data and the second data in the GUI in an integrated manner.

The at least one processor may be further configured to execute the instructions to: control to output the first data and the second data in the GUI in a selectable manner, receive a selection of at least one of the first data or the second data and receive at least one of first additional detailed information corresponding to the first data associated with the first user from the first application or second additional detailed information corresponding to the second data associated with the first user from the second application and control to output at least one of the first additional detailed information or the second additional detailed information in the GUI.

The first application may correspond to a first data source storing first service information related to a first service associated with the first user, and the second application may correspond to a second data source storing second service information related to a second service associated with the first user.

The first application may correspond to a first external server storing first service information related to a first service associated with the first user, and the second application may correspond to a second external server storing second service information related to a second service associated with the first user.

The at least one processor may be further configured to execute the instructions to control to display both the first data and the second data in a single pane.

According to another aspect of the disclosure, there is provided a method of providing information for a user in an integrated presentation system, the method including: receiving, from an application server, a plurality of parameters including first information corresponding to a first application, second information corresponding to a second application, and third information corresponding to one or more identifying parameters of a user, obtaining, from a database, first authentication information and a first destination address based on the first information, obtaining, from the database, second authentication information and a second destination address based on the second information, transmitting, based on the first destination address, a first request to a first server corresponding to the first application, the first request including the first authentication information and first metadata generated based on a first identifying parameter among the one or more identifying parameters of the user, transmitting, based on the second destination address, a second request to a second server corresponding to the second application, the second request including the second authentication information and second metadata generated based on a second identifying parameter among the one or more identifying parameters of the user, receiving first data associated with the user from the first server, receiving second data associated with the user from the second server and controlling to output the first data and the second data to an application server.

The first identifying parameter and the second identifying parameter may be the same.

The first server may store first service information related to a first service associated with the user, and the second server may store second service information related to a second service associated with the user.

The first server may be a first external server storing first service information related to a first service associated with the user, and the second server may be a second external server storing second service information related to a second service associated with the user.

The method may further include receiving the first data associated with the user from the first server, before transmitting the second request to the second server and obtaining the second identifying parameter from the first data, wherein the second metadata is generated based on the second identifying parameter, which is different from first identifying parameter.

According to another aspect of the disclosure, there is provided a server for providing information for a user, the server including: a memory storing instructions; and at least one processor configured to execute the instructions to: receive, from an application server, a plurality of parameters including first information corresponding to a first application, second information corresponding to a second application, and third information corresponding to one or more identifying parameters of a user, obtain first authentication information and a first destination address based on the first information, obtain second authentication information and a second destination address based on the second information, transmit, based on the first destination address, a first request to a first server corresponding to the first application, the first request including the first authentication information and first metadata generated based on a first identifying parameter among the one or more identifying parameters of the user, transmit, based on the second destination address, a second request to a second server corresponding to the second application, the second request including the second authentication information and second metadata generated based on a second identifying parameter among the one or more identifying parameters of the user, receive first data associated with the user from the first server, receive second data associated with the user from the second server and output the first data and the second data to the application server.

The first identifying parameter and the second identifying parameter may be the same.

The first server may store first service information related to a first service associated with the user, and the second server may store second service information related to a second service associated with the user.

The first server may be a first external server storing first service information related to a first service associated with the user, and the second server may be a second external server storing second service information related to a second service associated with the user.

The at least one processor is may be further configured to execute the instructions to: receive the first data associated with the user from the first server, before transmitting the second request to the second server, and obtain the second identifying parameter from the first data, wherein the second metadata is generated based on the second identifying parameter, which is different from first identifying parameter.

BRIEF DESCRIPTION OF THE DRAWINGS

Features, advantages, and significance of exemplary embodiments of the disclosure will be described below with reference to the accompanying drawings, in which like signs denote like elements, and wherein:

FIGS. 6A and 6B illustrate an example UI screen for searching for a user, according to an example embodiment;

FIGS. 7A-7G illustrate example screens in which customer information is provided in an integrated manner, according to an example embodiment.

DETAILED DESCRIPTION

Figure 1:
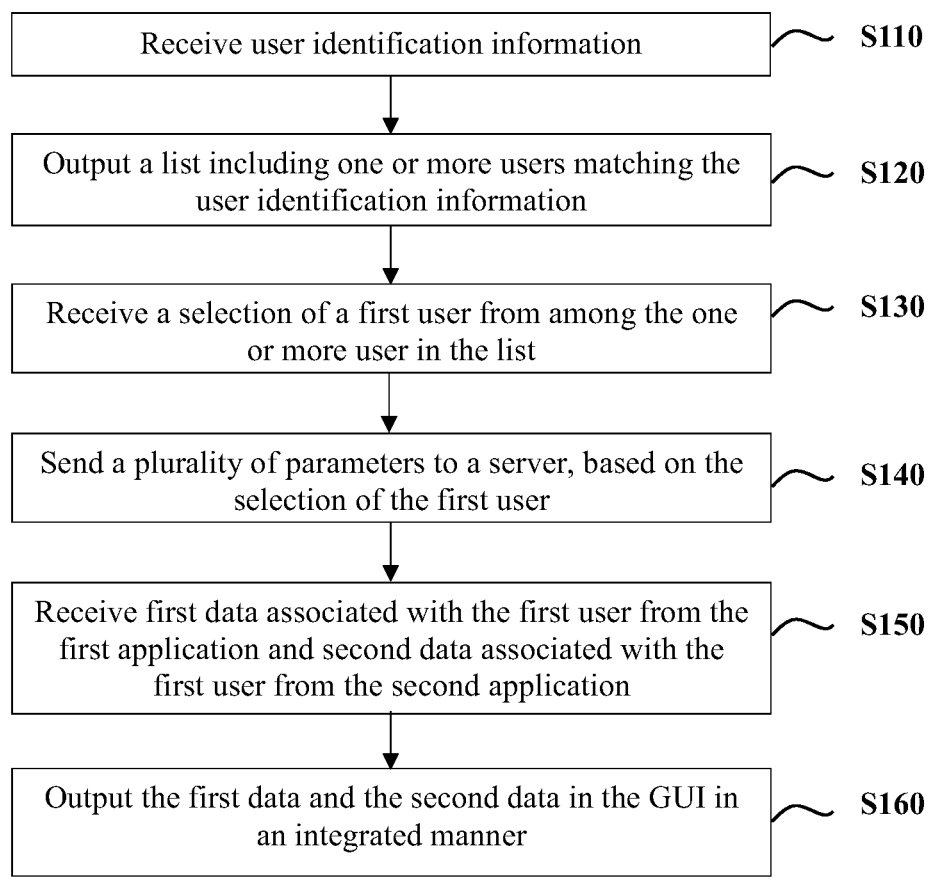
FIG. 1 is a flowchart of an example process for presenting information from different applications in an integrated manner on a platform, according to an example embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which global variables are defined in a platform and set for the automatic transfer of values thereof from one open screen of an application to another open screen of a different application. As a result, human error and time cost in inputting information to user input fields of an application interface is eliminated. Further, by directly transferring the information between open application screens, there is no need to connect to a backend database, thereby conserving network resources and bandwidth.

FIG. 1 is a flowchart of an example process for presenting information from different applications in an integrated manner on a platform, according to an example embodiment. Here, the platform may refer to an application platform that hosts, communicates with and/or deploys a plurality of applications. For example, the application platform may be a cloud platform including one or more servers in which the one or more applications are deployed. In this case, the application platform may be a cloud platform for a particular business or enterprise in which applications are deployed for use by employees and/or customers of the business (e.g., applications for day-to-day operations of the business, processing or inputting sales information, communicating with customers, troubleshooting, etc.). Further, the platform and applications therein may be built, hosted, and deployed in accordance with a microservices architecture. The applications in the application platform are configured to output or expose data. According to an example embodiment, the application platform may be built to communicate with various applications. According to an example embodiment, the various applications may be applications deployed on external servers. According to an example embodiment, the various applications may be third party applications deployed on external servers.

Referring to FIG. 1, at operation S110, user identification information may be received by the platform. According to an example embodiment, a first screen of a first application opened on the platform is output for display. For example, the first screen may be output for display on a display unit of a terminal device. According to an example, embodiment, the terminal device may access the first application, such as through a web browser, over a network. According to another embodiment, the first screen may be displayed on a same device that stores and executes the first application. According to an example embodiment, the terminal device may be used by an agent or employee of a particular business or enterprise, where the first application is deployed for use by agents or the employees of the business. According to an example embodiment, the first application may be used while communicating with users (e.g., customers) for troubleshooting, answering queries, addressing issues, etc.

Hereinafter, a screen (or execution screen) may refer to a particular user interface screen or page of an application, and the output or displayed screen may be an instance of the screen. By way of non-limiting example, the first application may be a customer account application that includes a screen (e.g., first screen) in which fields for searching a customer account is displayed, as shown by way of example in FIG. 6A.

According to an example embodiment, in the operation S110, a user (e.g., a customer agent) may enter user identification information, which is received by the platform. According to an example embodiment, an application server running the first application may receive the user identification information, which is entered by the customer agent to search for a user. According to an example embodiment, the user identification information may be at least of the following parameters: first name, last name, mobile number, email address, account number, email address, etc. However, the disclosure is not limited thereto, and as such, other types of user identification information may be input to search for a user. According to an example embodiment, two or more parameters may be entered together as the user identification information used to search for a user.

In operation S120, the first application may output a list including one or more users matching the user identification information based on the received user identification information. According to an example embodiment, the application server running the first application may search a database and retrieve users matching the received user identification information. According to an example embodiment, the first application (e.g., the application server or a processor running the first application) may control a display unit to display a second screen including the list of one or more users. An instance of the screen (e.g., output second screen) may correspond to and include information of one or more users, as shown by way of example in FIG. 6B. According to an example embodiment, the list of users may include active customers, inactive customers, prospective customers or other individuals registered in the platform.

At operation S130, the first application may receive a selection of a first user (e.g., a first customer) from among the one or more user in the list output on the screen. At operation S140, the first application may send a plurality of parameters to a server to fetch data corresponding to the first user. According to an example embodiment, the first application may use APIs (Application Programming Interface) to communicate with the server. According to an example embodiment, the server may be a gateway server configured to communicate and fetch the data corresponding to the first user from various data sources. The various data sources may correspond to different applications and/or services associated with the first user. According to an example embodiment, the different applications and/or services associated with the first user may include external third party vendors or internal applications in the platform. According to an example embodiment, the plurality of parameters may include information corresponding to a second application, information corresponding to a third application, and information corresponding to one or more identifying parameters of the selected first user. According to an example embodiment, information corresponding to the second application and information corresponding to the third application may be simultaneously sent to the gateway server. According to an example embodiment, information corresponding to the second application and information corresponding to the third application may be sequentially sent to the gateway server.

In operation S150, the first application may receive first data associated with the first user from the second application. According to an example embodiment, the first data may be fetched or retrieved from a first data source associated with the second application. Moreover, according to an example embodiment, second data associated with the first user from the third application. According to an example embodiment, the second data may be fetched or retrieved from a second data source associated with the third application. According to an example embodiment, detailed description regarding the features and/or operations of the gateway server are provided below with reference to FIG. 4.

In operation S160, the first application may output the first data and the second data on a third screen in an integrated manner. In one or more embodiments, the third screen may be output and displayed in a single pane window including the first data and the second data in a integrated manner. According to an example embodiment, the first data and the second data may be displayed in a tiled, side-by-side, or non-overlapping manner. Further, the first data and second data may both be displayed within a same tab of a browser window. In an example embodiment where the second and third applications are deployed in a microservices architecture, the first data and second data may be micro frontends, e.g., of a same microservices domain (a model in which clusters of different data entities and processes correspond to or control a particular and significant area of functionality).

According to an aspect of the disclosure as illustrated according to an example embodiment in FIG. 1, instead of an agent having to log into multiple systems, various data (e.g., the first data and the second data) from different data sources are provided in an integrated manner in one single view. As a result, input errors are minimized, time (and corresponding computing resources such as power) consumption is reduced, user convenience is increased, and network resources are conserved.

Figure 2:
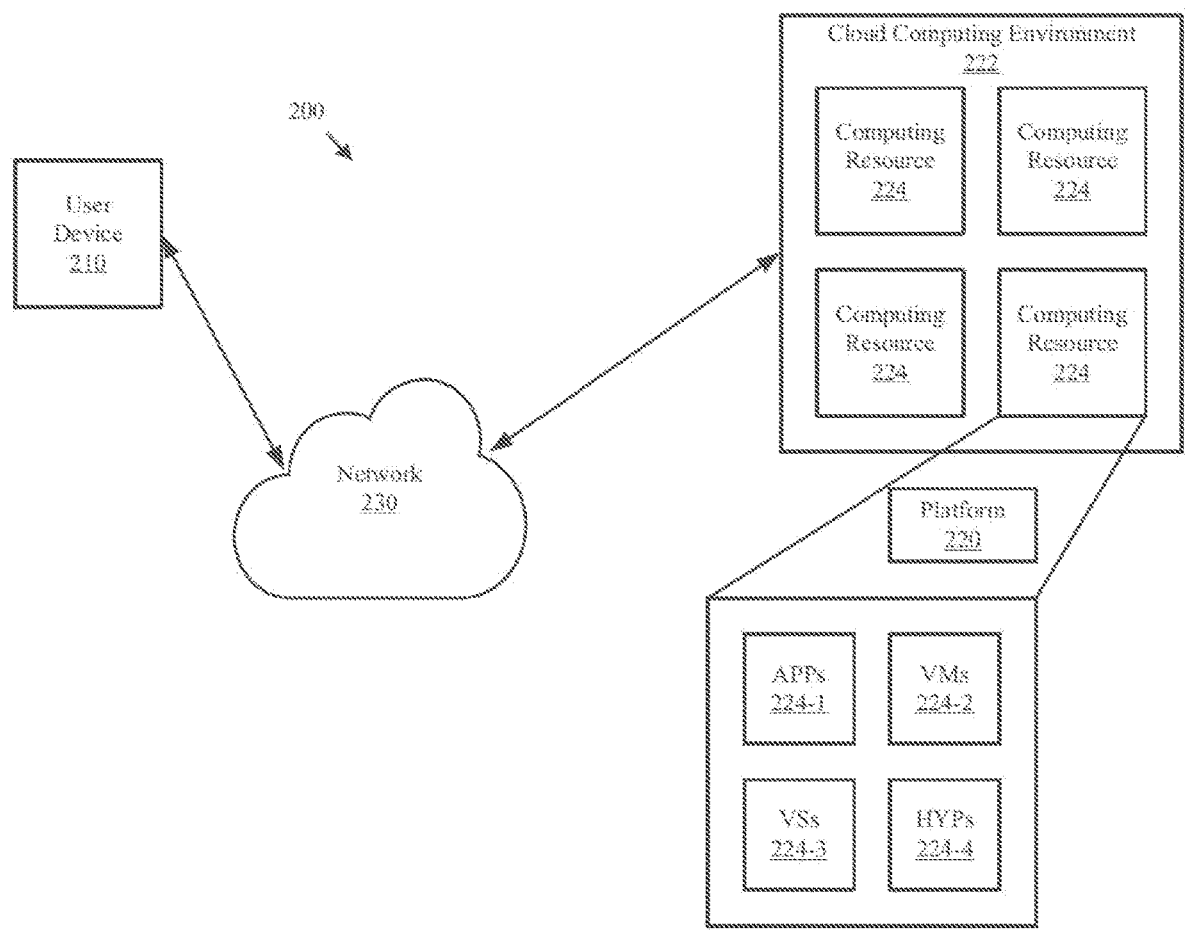
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIG. 1 above may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
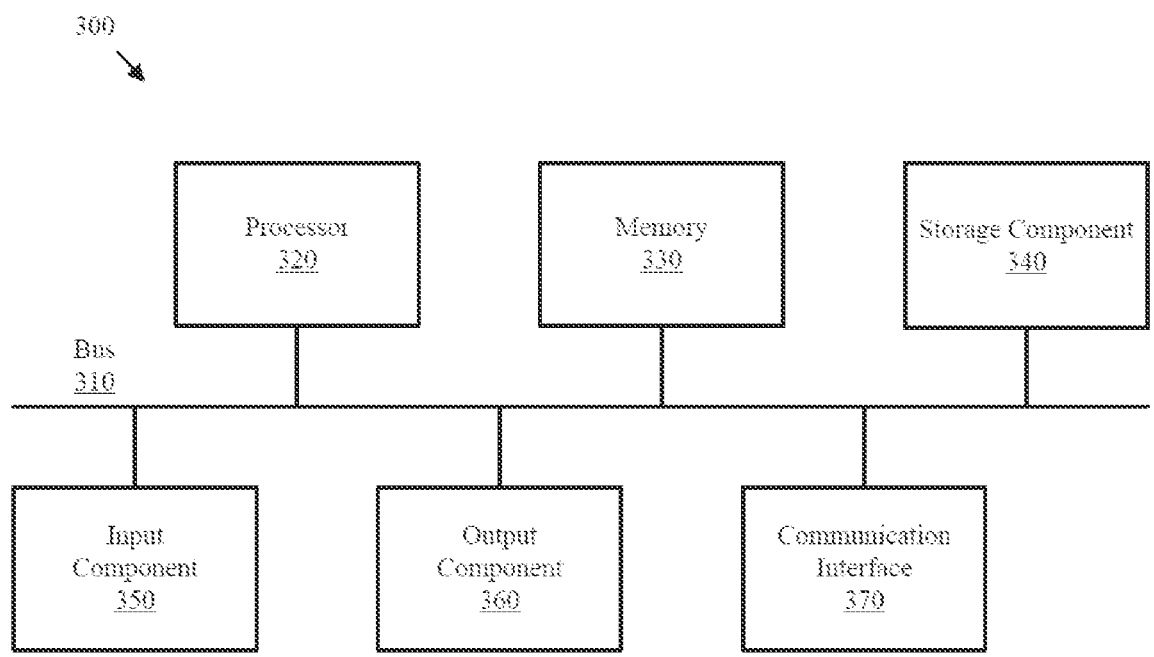
FIG. 3 is a diagram of example components of a device according to an example embodiment.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes of FIG. 1 may be implemented by or using any one of the elements illustrated in FIGS. 2-3.

Figure 4:
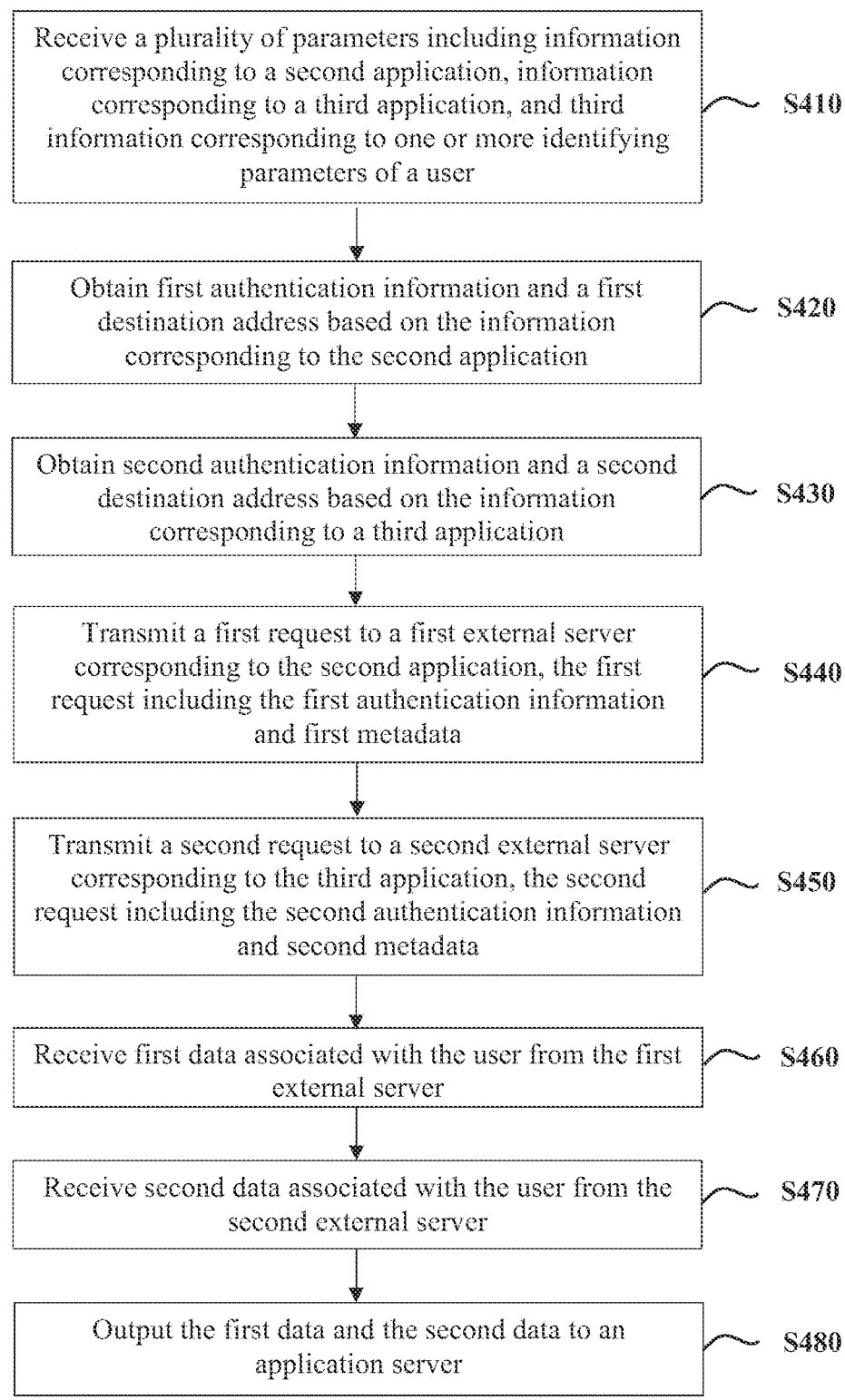
FIG. 4 is a flowchart of an example process for fetching information from different applications to be presented in an integrated manner, according to an example embodiment.

FIG. 4 is a flowchart of an example process for fetching information from different applications to be presented in an integrated manner, according to an example embodiment. For example, the method shown in FIG. 4 may correspond to operations that occur between operations S140 and S150 in FIG. 1.

Referring to FIG. 4, in operation S410, a server may receive a plurality of parameters from an application server. For example, the server may be a gateway server, which receives the plurality of parameters from the first application. The plurality of parameters may be the parameters transmitted by the first application in operation S140. According to an example embodiment, the plurality of parameters may include information corresponding to a second application, information corresponding to a third application, and information corresponding to one or more identifying parameters of the user.

In operation S420, the server may obtain, from a database, first authentication information and a first destination address based on the information corresponding to a second application. According to an example embodiment, the database may store authentication information, destination address and application and/or service identifier associated with each other. For example, the database may store, for each application or service, a unique identifier name, end-point value, authorization information in association with each other. According to an example embodiment, one or more of the applications or services may correspond to a third party vendor providing a service for the user. However, the disclosure is not limited thereto, and as such, according to another example embodiment, one or more of the applications or services may correspond to applications provided in-house by the business or enterprise.

According to an example embodiment, the end-point value may be IP address of a data source corresponding the application or service. The IP address may be the destination address. According to an example embodiment, the authorization information may be provided in advance by the provider of the application or service. For example, a vendor may provide authentication information to access and retrieve data from an external database of the vendor.

In operation S430, the server may obtain, from the database, second authentication information and a second destination address based on the information corresponding to a third application.

In operation S440, the server may transmit, based on the first destination address, a first request to a first external server corresponding to the second application, the first request including the first authentication information and first metadata generated based on a first identifying parameter among the one or more identifying parameters of the user.

In operation S450, the server may transmit, based on the second destination address, a second request to a second external server corresponding to the third application, the second request including the second authentication information and second metadata generated based on a second identifying parameter among the one or more identifying parameters of the user. According to an example embodiment, the first identifying parameter and the second identifying parameter are the same.

In operation S460, the server may receive first data associated with the user from the first external server and in operation S470, the server may receive second data associated with the user from the external second server.

In operation S480, the server may transmit the first data and the second data to an application server. According to an example embodiment, the transmitted first data and second data may correspond to the first data and second data received in operation S150.

According to an example embodiment, the first external server may store first service information related to a first service associated with the user, and the second external server may store second service information related to a second service associated with the user. According to an example embodiment, the first external server is a first external server storing first service information related to a first service associated with the first user, and the second server is a second external server storing second service information related to a second service associated with the user.

According to an example embodiment, the order of operations S420 to S470 are not limited to the illustration in FIG. 4. For instance, according to an example embodiment, receiving of the first data associated with the user from the first external server in operation may occur before the transmission the second request to the second server. In this case, the second identifying parameter may be obtained from the first data. Moreover, according to an example embodiment, the second metadata may be generated based on the second identifying parameter, which is different from first identifying parameter.

Figure 5A:
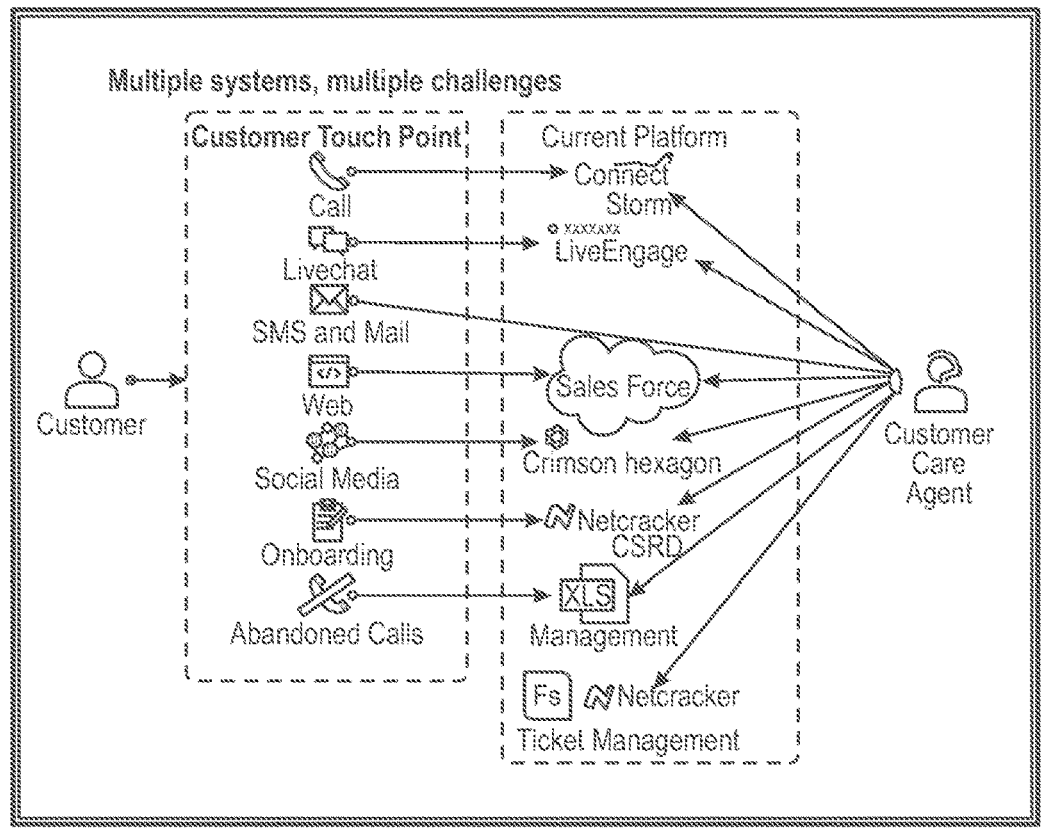
FIG. 5A illustrates a related art customer information presentation system and FIG. 5B illustrates customer information presentation system according to an example embodiment.
Figure 5B:
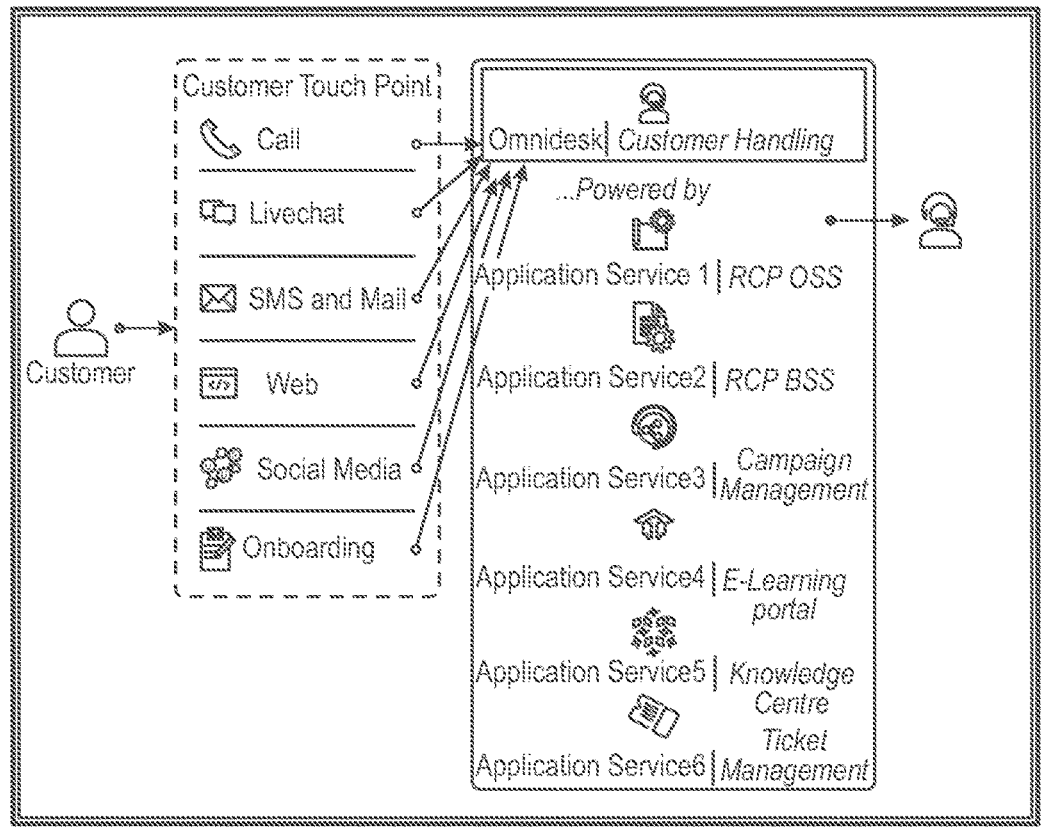

FIG. 5A illustrates a related art customer information presentation system and FIG. 5B illustrates customer information presentation system according to an example embodiment. As illustrated in FIG. 5A, in order to access various customer information of a user (or a customer), an agent has to log into multiple systems to retrieve the various customer information. As such, due to accessing multiple systems or applications, the agent has to face multiple challenges which made the process more time consuming, more tedious user experience and also delays in resolving the customer query/issues. The various customer information may include, but not limited to, information related to network, device, documents or social media, onboard, text and mail service, etc.

In comparison to the related art system in FIG. 5A, FIG. 5B illustrates an improved system for obtaining customer information according to an example embodiment. For instance, according to one or more example embodiments of the disclosure, the system allows an agent to access and gather customer information from various data sources through single view pane for all customer information powered by real-time search. For instance, instead of logging into multiple systems, the system according to an example embodiment provides all in customer information related to the customer from various vendors information in one single view. According to an example embodiment, the integration of the information from multiple venders in one single view with all necessary customer details and interactions pertaining to network, billing and devices, may be further enriched by analytics and algorithms. As such, the method and systems of the disclosure provide a smooth and user friendly process, which avoid the cumbersome and time consuming approach of the related art systems. Moreover, in view of the streamlined and integrated approach of the systems according to an example embodiment, system resources may be utilized in an efficient manner.

FIGS. 6A and 6B illustrate an example UI screen for searching for a user, according to an example embodiment. As illustrated in FIG. 6A, any of the following inputs may be used as a parameter for search for a customer: First Name, Last Name, Mobile Number, Email address, Customer Account Number, etc. However, the disclosure is not limited thereto, and as such, other information may be used to search for the customer.

According to an example embodiment, one or more users matching the parameters entered in FIG. 6A, may be displayed in a list as shown in FIG. 6B. According to an example embodiment, filters may be applied to the list to further drill down. For instance, according to an example embodiment, the list may be sorted or filtered based on whether the user is an active customer. According to another example embodiment, the list may be sorted or filtered based on whether the user is currently in call with the agent assisting the user.

FIGS. 7A-7G illustrate example screens in which customer information is provided in an integrated manner, according to an example embodiment.

Figure 7A:
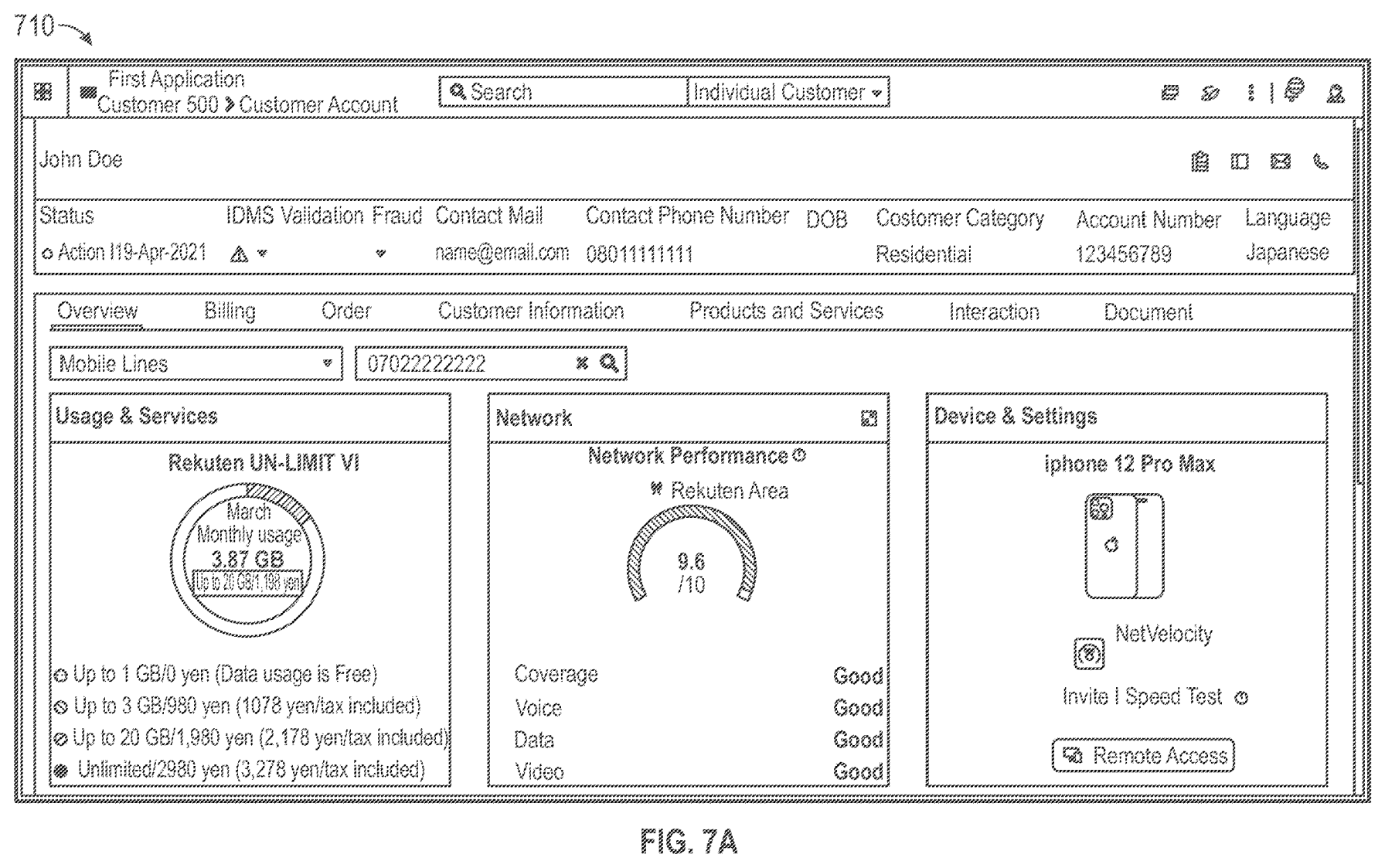

Referring to FIG. 7A, according to an example embodiment, a customer 3600 view may be created with all necessary customer details such as, but not limited to, billing and device information, further enriched by analytics and algorithms to investigate and handle customer issues and queries. In FIG. 7A, a graphical user interface (GUI) screen is shown, in which, information related to usage and services, information related to network and information related to device and settings are displayed in an integrated manner on a single viewing window.

According to an example embodiment, the system may capture real time individual network and calls experiences and scores of mobile services integration tools powered by data analytics and algorism to visualize and provide better customer network experiences. Accordingly, the system may be able to resolve customer inquiries faster using AI-assisted decision trees to suggest possible answers for customer support agent. Moreover, post analytics of decision-trees may help the customer support agent to resolve inquiry handling flows and identify major network issues.

According to an example embodiment, the following information may be integrated. For example, based on a service, such as operations support system (OSS) or business support system (BSS), a customer's basic information such as customer name, email ID, address, mobile number, category, account number, mobile lines and CASA associated to the customer may be retrieved and displayed in an integrated manner.

According to an example embodiment, based on a mobile lines service provider, the billing and payment details of the customers may be retrieved and displayed in an integrated manner.

According to an example embodiment, based on a network service provider, the customer's Network details and service timelines in the form of Coverage, Data, Voice and Video scores may be retrieved and displayed in an integrated manner. The data consumed by the customer may also visualized along with the coverage and VVM (Voice, Video, Multimedia) details.

According to an example embodiment, based on a network monitoring service provider, the device information along with the SIM details associated to the device is fetched and displayed using IMSI-IMEI of device.

According to an example embodiment, based on a social media service provider, the social media status of the customer device is fetched. For instance, the status may be represented based on following conditions:

if logged = true, user is online if logged = false, user is logged out if first login = 0, user never logged in According to an example embodiment, based on a member service provider, points and member rank of the customer may be fetched and displayed. The customer may be categorized based on the rank received, such as, Regular, Silver, Gold, Platinum or Diamond.

In FIGS. 7B-7E, GUI screens show details of different tabs in the integrated GUI illustrated in FIG. 7A. However, the disclosure is not limited thereto, and as such, various other information may be presented in various other formats.

For instance, in FIG. 7B, a billing tab is shown, which displays details about customer billing information. In FIGS. 7C and 7D, an interaction tab is shown, which displays details about customer interaction information. In FIG. 7E, a documents tab is shown, which displays details about documents submitted by the customer.

In FIG. 7F, a GUI screen with an SMS or Call tab is shown, which allows the customer agent to directly text and call the user from the integrated display illustrated in FIG. 7A.

Figure 7G:
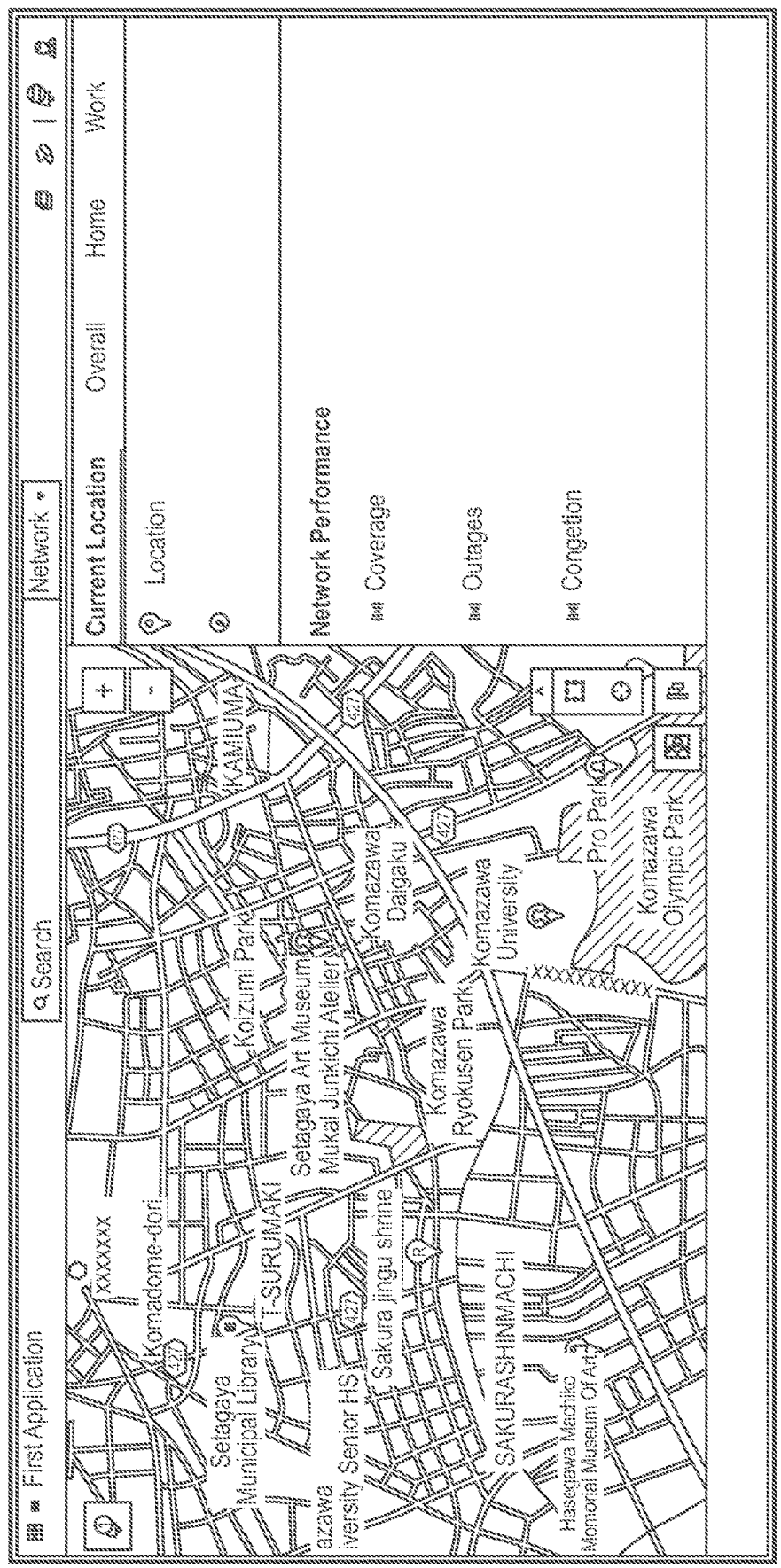

In FIG. 7G, a GUI screen is shown, in which, geo-location information of the user may be provided to enhance customer support. For instance, according to an example embodiment, the system may capture real-time customer network experiences with GIS-based analytics by visualizing active, planned and outage sites information with network coverage for providing geo-location based customer supports. Moreover, the system may visualize real time customer feedback and complaints based on submitted Rich Communication Service (RCS) in-app feedback combined with geo-location data in GIS map for network improvement based on real customer voices.

Figure 8:
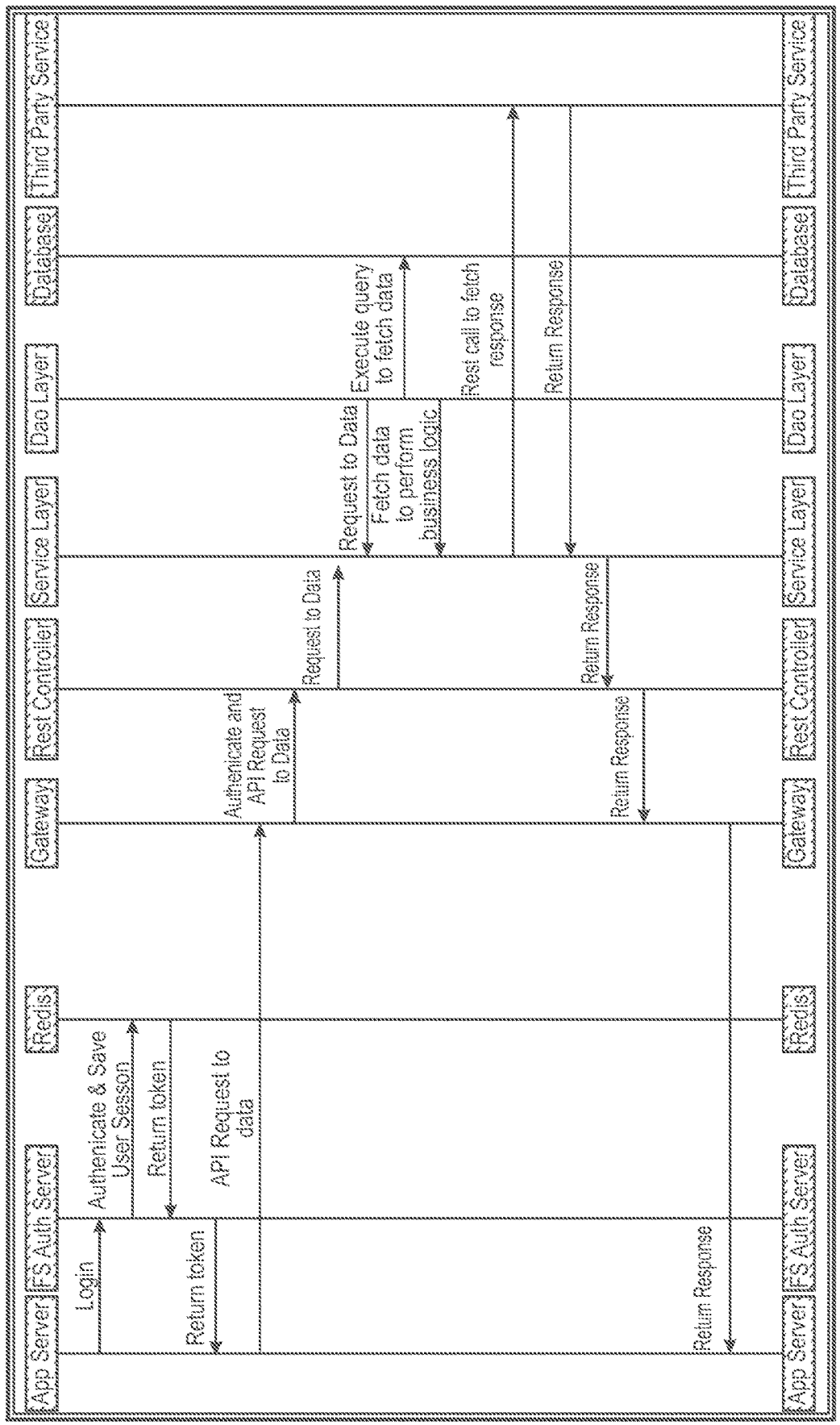
FIG. 8 is a flowchart of an example process in a system, according to an example embodiment.

FIG. 8 is a flowchart of an example process in a system, according to an example embodiment.

According to an example embodiment, a user request may be first authenticated and authorized using a authentication server (i.e., key cloak), and thereafter, a Service layer may establish a connection to fetch data from a vendor API (i.e., third party services).

In detail, as illustrated in FIG. 8, according to an example embodiment, a user may input login information or authentication information in an application running on a terminal device. According to an example embodiment, the user may by an agent or an employee of a particular business or enterprise, where the application is deployed at the terminal device for use by agents or the employees of the business. According to an example embodiment, the application communicates with an application server, which provides the login information or authentication information to an authentication server. According to an example embodiment, the authentication server may be an FS server. According to an example embodiment, the authentication server may further communicate with a database to access authentication information to authenticate the user. According to an example embodiment, the authentication server may have the authentication information stored internally or at an external storage to perform the authentication. For example, the authentication server may access a datastore to retrieve authentication information to perform the authentication. According to an example embodiment, the datastore may provide or return a token to the authentication server, and the authentication server returns the token to the application server to authentication the user. However, the disclosure is not limited thereto, and as such, authentication server may authenticate the user in a different manner.

According to an example embodiment, after the user is authenticated, the user may request for customer information. According to an example embodiment, the user may request for customer information from external servers through the application. According to an example embodiment, the user may request for customer information from third party vendors through the application. That is, according to an example embodiment, the external third servers may be servers of third party vendors. According to an example embodiment, the application, via the application server, may transmit an API request to receive the customer information from the vendor servers. According to an example embodiment, the API request or the request for data may be forwarded to a Service layer through a gateway layer and/or a REST controller. However, the disclosure is not limited thereto, and as such, other layers and/or network devices may be provided between the authentication server and the Service layer.

According to an example embodiment, the Service layer may establish a connection to fetch data from vendor API (third party services). According to an example embodiment, the Service layer may retrieve authentication information to access one or more external severs or the third party services and establish a connection with each of the one or more external severs or the one or more third party services. For example, the Service layer may retrieve unique and separate authentication information for establishing connection each of the one or more third party services. For example, the unique and separate authentication information may provide access to databases of each of the third party services to retrieve data. According to an example embodiment, the Service layer may retrieve the authentication information from a database through a data access object (DAO) layer. According to an example embodiment, the authentication information may include data to perform application logic and/or business logic to retrieve customer information. For example, the authentication information may including end-point value, such as IP address of a data source corresponding the application or service (i.e., third party service or vendor service).

However, the disclosure is not limited thereto, and as such, according to an example embodiment, another component or device in the network may retrieve authentication information to access one or more of the third party services. For example, the gateway server may retrieve authentication information for each of the plurality of vendor services.

According to an example embodiment, the Service layer may use the authentication information to establish separate connections with one or more of the third party applications or services and retrieve customer information from the third party applications or services. According to an example embodiment, the retrieved customer information is transmitted to the application, and displayed on a UI screen of the application on the terminal device. According to an example embodiment, the retrieved information may be transmitted to the application through one or more of Service layer, REST controller, Gateway layer, application service. However, the disclosure is not limited thereto, and as such, other network devices may be provided in between the application and the third party services or applications.

According to an example embodiment, a screen of the application can automatically obtain and input values for customer information fields directly from vendor servers. As a result, according to an example embodiment, the application may not have to store the customer information in a local database, thereby conserving resources and maintaining security and privacy.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein

What is claimed is:

1. A method of providing information for a user in an integrated presentation system, the method comprising:
    based on receiving user identification information, controlling to output a list including one or more users matching the user identification information in a graphical user interface (GUI);
    receiving a selection of a first user from among the one or more user in the list output on the GUI;
    sending a plurality of parameters to a server, the plurality of parameters including first information corresponding to a first application, second information corresponding to a second application, and third information corresponding to one or more identifying parameters of the selected first user;
    receiving first data associated with the first user from the first application and second data associated with the first user from the second application; and
    controlling to output the first data and the second data in the GUI in an integrated manner.

2. The method according to claim 1, further comprising:
    controlling to output the first data and the second data in the GUI in a selectable manner;
    receiving a selection of at least one of the first data or the second data;
    receiving at least one of first additional detailed information corresponding to the first data associated with the first user from the first application or second additional detailed information corresponding to the second data associated with the first user from the second application; and controlling to output at least one of the first additional detailed information or the second additional detailed information in the GUI.

3. The method according to claim 1, wherein the first application corresponds to a first data source storing first service information related to a first service associated with the first user, and wherein the second application corresponds to a second data source storing second service information related to a second service associated with the first user.

4. The method according to claim 1, wherein the first application corresponds to a first external server storing first service information related to a first service associated with the first user, and wherein the second application corresponds to a second external server storing second service information related to a second service associated with the first user.

5. The method according to claim 1, further comprising: controlling to display both the first data and the second data in a single pane.

6. An integrated presentation system for providing information for a user, the integrated presentation system comprising:

a memory storing instructions; and at least one processor configured to execute the instructions to:

based on receiving user identification information, control to output a list including one or more users matching the use identification information in a graphical user interface (GUI);

receive a selection of a first user from among the one or more user in the list output on the GUI;

send a plurality of parameters to a server, the plurality of parameters including first information corresponding to a first application, second information corresponding to a second application, and third information corresponding to one or more identifying parameters of the selected first user;

receive first data associated with the first user from the first application and second data associated with the first user from the second application; and control to output the first data and the second data in the GUI in an integrated manner.

7. The integrated presentation system according to claim 6, wherein the at least one processor is further configured to execute the instructions to:

control to output the first data and the second data in the GUI in a selectable manner;

receive a selection of at least one of the first data or the second data;

receive at least one of first additional detailed information corresponding to the first data associated with the first user from the first application or second additional detailed information corresponding to the second data associated with the first user from the second application; and control to output at least one of the first additional detailed information or the second additional detailed information in the GUI.

8. The integrated presentation system according to claim 6, wherein the first application corresponds to a first data source storing first service information related to a first service associated with the first user, and wherein the second application corresponds to a second data source storing second service information related to a second service associated with the first user.

9. The integrated presentation system according to claim 6, wherein the first application corresponds to a first external server storing first service information related to a first service associated with the first user, and wherein the second application corresponds to a second external server storing second service information related to a second service associated with the first user.

10. The integrated presentation system according to claim 6, wherein the at least one processor is further configured to execute the instructions to control to display both the first data and the second data in a single pane.

11. A method of providing information for a user in an integrated presentation system, the method comprising:

receiving, from an application server, a plurality of parameters including first information corresponding to a first application, second information corresponding to a second application, and third information corresponding to one or more identifying parameters of a user;

obtaining, from a database, first authentication information and a first destination address based on the first information;

obtaining, from the database, second authentication information and a second destination address based on the second information;

transmitting, based on the first destination address, a first request to a first server corresponding to the first application, the first request including the first authentication information and first metadata generated based on a first identifying parameter among the one or more identifying parameters of the user;

transmitting, based on the second destination address, a second request to a second server corresponding to the second application, the second request including the second authentication information and second metadata generated based on a second identifying parameter among the one or more identifying parameters of the user;

receiving first data associated with the user from the first server;

receiving second data associated with the user from the second server; and controlling to output the first data and the second data to an application server.

12. The method of claim 11, wherein the first identifying parameter and the second identifying parameter are the same.

13. The method according to claim 11, wherein the first server stores first service information related to a first service associated with the user, and wherein the second server stores second service information related to a second service associated with the user.

14. The method according to claim 11, wherein the first server is a first external server storing first service information related to a first service associated with the user, and wherein the second server is a second external server storing second service information related to a second service associated with the user.

15. The method according to claim 1, further comprising:

receiving the first data associated with the user from the first server, before transmitting the second request to the second server; and obtaining the second identifying parameter from the first data, wherein the second metadata is generated based on the second identifying parameter, which is different from first identifying parameter.

16. A server for providing information for a user, the server comprising:
a memory storing instructions; and
at least one processor configured to execute the instructions to:
receive, from an application server, a plurality of parameters including first information corresponding to a first application, second information corresponding to a second application, and third information corresponding to one or more identifying parameters of a user;
obtain first authentication information and a first destination address based on the first information;
obtain second authentication information and a second destination address based on the second information;
transmit, based on the first destination address, a first request to a first server corresponding to the first application, the first request including the first authentication information and first metadata generated based on a first identifying parameter among the one or more identifying parameters of the user;
transmit, based on the second destination address, a second request to a second server corresponding to the second application, the second request including the second authentication information and second metadata generated based on a second identifying parameter among the one or more identifying parameters of the user;
receive first data associated with the user from the first server;
receive second data associated with the user from the second server; and
output the first data and the second data to the application server.

17. The server of claim 16, wherein the first identifying parameter and the second identifying parameter are the same.

18. The server according to claim 16, wherein the first server stores first service information related to a first service associated with the user, and
wherein the second server stores second service information related to a second service associated with the user.

19. The server according to claim 16, wherein the first server is a first external server storing first service information related to a first service associated with the user, and
wherein the second server is a second external server storing second service information related to a second service associated with the user.

20. The server according to claim 16, wherein the at least one processor is further configured to execute the instructions to:
receive the first data associated with the user from the first server, before transmitting the second request to the second server; and
obtain the second identifying parameter from the first data,
wherein the second metadata is generated based on the second identifying parameter, which is different from first identifying parameter.

* * * * *